United States Patent [19]
Richens et al.

[11] 3,831,488
[45] Aug. 27, 1974

[54] KEY VISE GAUGE

[75] Inventors: Robert H. Richens, Macedonia;
Charles A. Garner, Strongsville, both of Ohio

[73] Assignee: Cole National Corporation, Cleveland, Ohio

[22] Filed: Nov. 20, 1972

[21] Appl. No.: 308,275

[52] U.S. Cl................ 90/13.05, 269/153, 269/266, 269/228, 269/318
[51] Int. Cl......... B23c 9/00, B25b 1/14, B25b 1/20
[58] Field of Search............ 90/13.05; 269/36, 259, 269/266, 271, 265, 153, 228, 315, 318, 319

[56] References Cited
UNITED STATES PATENTS
3,732,781   5/1973   Hungerford et al. ............ 90/13.05

*Primary Examiner*—Francis S. Husar
*Attorney, Agent, or Firm*—Woodling, Krost, Granger & Rust

[57] ABSTRACT

A key vise gauge is disclosed wherein a cam moves two cam follower links to move two bottom gauges in each of two key vises. The gauges move laterally within apertures in the key vise jaws and have three positions to accommodate three different styles of keys. Two of the positions are symmetrical about the cam axis and a third position of the gauges is assymmetrical to accommodate a master key and a key blank in the same attitude in the two vises. The foregoing abstract is merely a resume of one general application, is not a complete discussion of all principles of operation or applications and is not to be construed as a limitation on the scope of the claimed subject matter.

11 Claims, 12 Drawing Figures

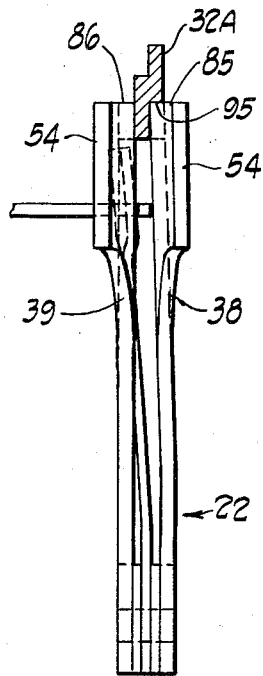
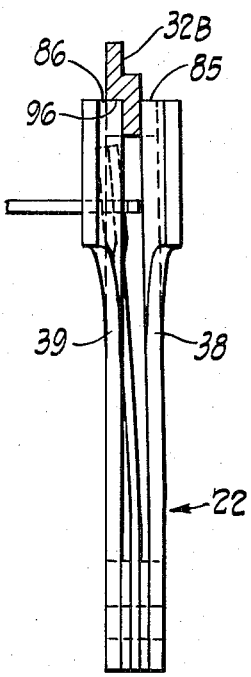
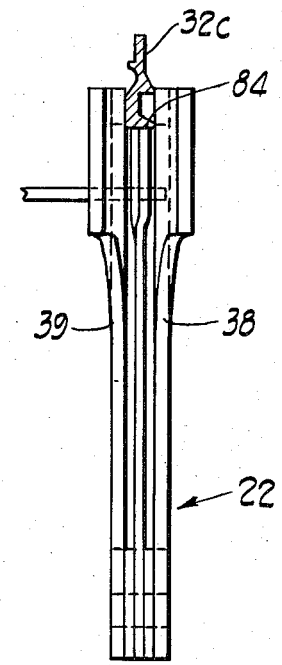
Fig. 7          Fig. 8          Fig. 9
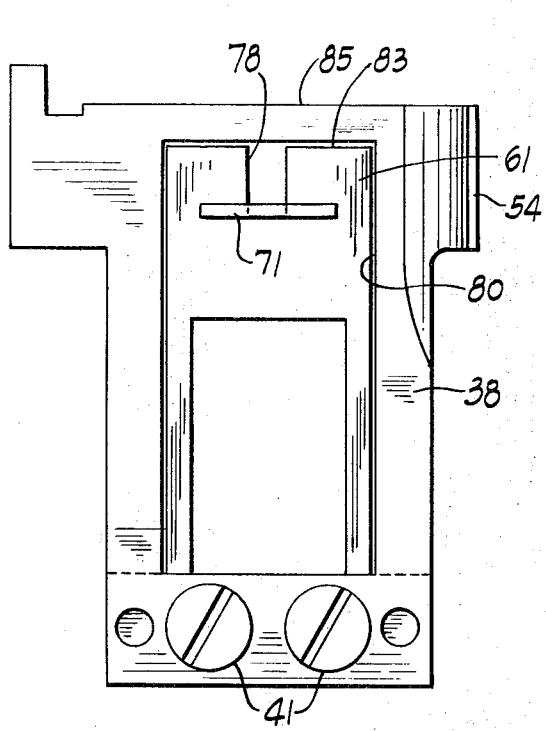
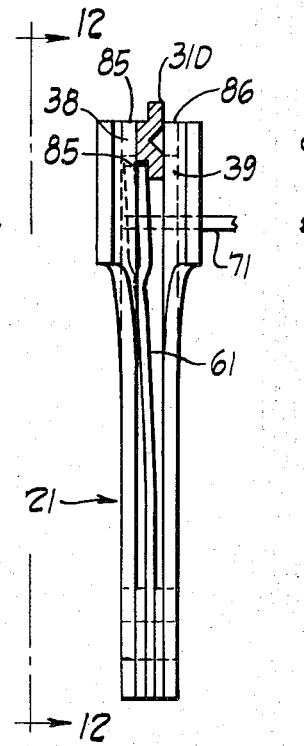
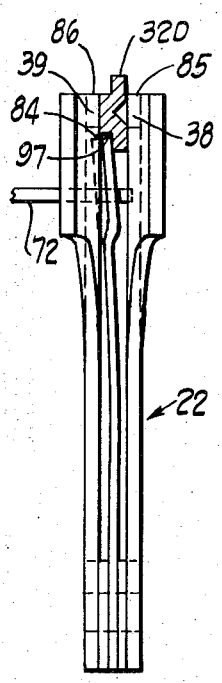
Fig. 12          Fig. 10          Fig. 11

KEY VISE GAUGE

BACKGROUND OF THE INVENTION

Key making machines in the past have been generally of the type wherein a relatively experienced operator operates the machine and gets used to the idiosyncrasies of such machine. In industrialized countries today, the key duplicating machines are often found in retail merchandising stores of the type wherein many different people may operate the key making machine. Accordingly, many of the prior art machines were much too complicated for the ordinary retail store clerk to operate without considerable experience. Still further the key making machines of the prior art often were the type which accommodated only a single key type and to accommodate different key types an adapter of some type had to be used with the gauge. These adapters could readily be lost especially when more than one person operated the key making machine.

Accordingly, it is an object of the invention to provide a key making machine with a vise structure which obviates the above-mentioned disadvantages.

Another object of the invention is to provide a key vise structure with a gauge which is self-contained with no parts to be lost.

Another object of the invention is to provide a key vise structure with a gauge which operates simultaneously for both the master key vise and the blank key vise.

Another object of the invention is to provide a key vise structure with a gauge wherein the master key and blank key may always be kept in the same attitude regardless of the surface of the key which is being gauged.

SUMMARY OF THE INVENTION

The invention may be incorporated in a key vise structure, comprising in combination, a frame, a vise having a movable and a secondary vise jaw, a bottom gauge for said vise mounted for limited lateral movement between first and second positions in said vise, an aperture in one of said vise jaws to accommodate said lateral movement of said bottom gauge, a cam pivotally mounted on said frame and movable into first and second conditions, and a cam follower link coacting with said cam and with said gauge to laterally move said gauge in accordance with movement of said cam between said first and second conditions to move said gauge at least partially into said jaw aperture in one position of said gauge.

Other objects and a fuller understanding of the invention may be had by referring to the following description and claims, taken in conjunction with the accompanying drawing.

BRIEF DESCRIPTION OF THE DRAWINGS

FIGS. 7–11 are enlarged partial front views of the vises showing clamping of different types of keys; and FIG. 12 is a sectional view on line 12—12 of FIG. 10.

DESCRIPTION OF THE PREFERRED EMBODIMENT

Figure 1:
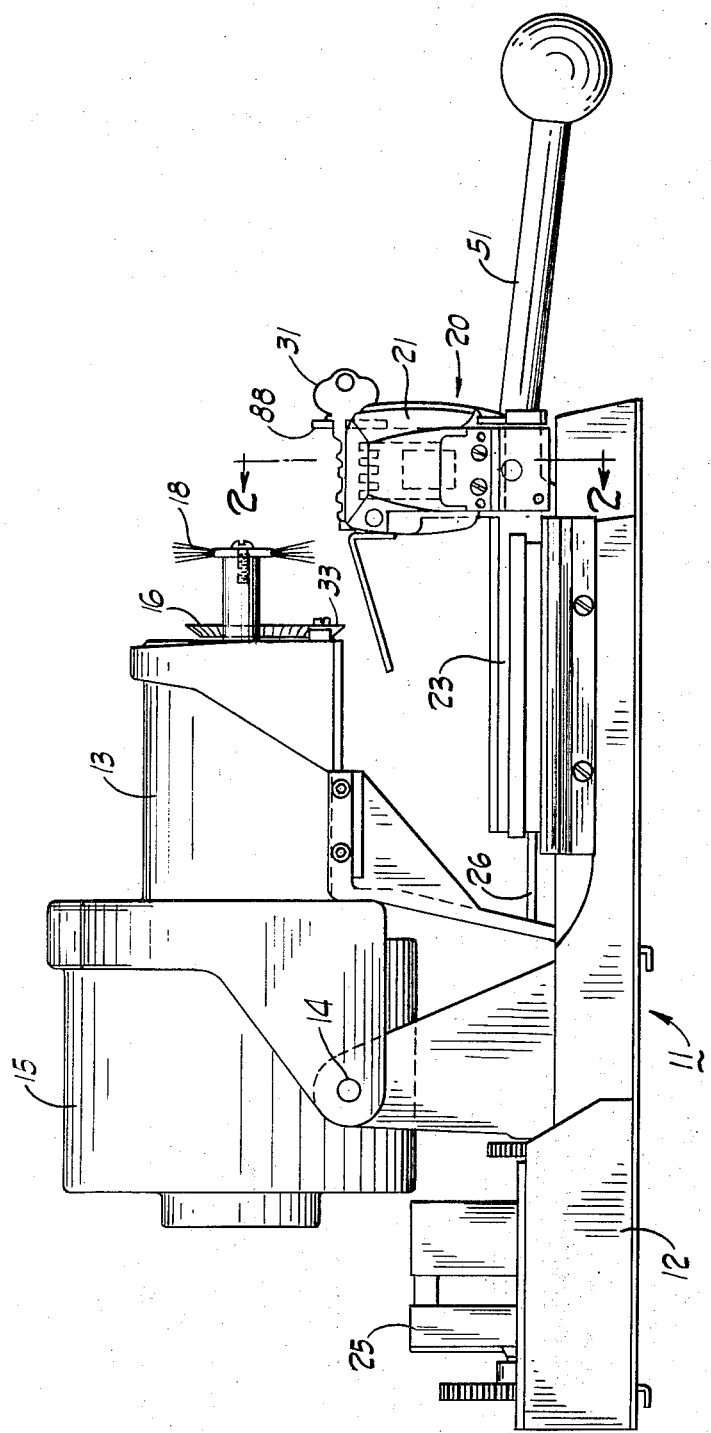
FIG. 1 is a side elevational view of a key machine embodying the invention.

The drawing illustrates a key machine 11 showing the construction of the preferred embodiment of the invention. This key machine has a main frame 12 pivotally supporting a cutter head 13 at a pivot 14. A motor 15 on head 13 drives a milling cutter 16 through gearing at a reduced speed and directly drives a brush 18 to aid in removal of any burr on the completed key.

The key machine 11 also includes a vise structure 20 including a first vise 21 and a second vise 22. These vises 21 and 22 are identical except for being mirror images of each other. The vise structure 20 includes a vise frame 23 which is mounted by a ball track 24 for longitudinally reciprocating movements on the main frame 12 toward and away from the milling cutter 16. A motor and speed reduction unit 25 is mounted in the main frame 12 and connected by a link 26 to the vise frame 23 to provide this powered longitudinal movement of the vise structure 20.

The two vises 21 and 22 each are adapted to mount a key. The first vise 21 in this preferred embodiment is adapted to mount a master key 31 which already has the proper bits or notches thereon and the second vise 22 is adapted to mount a key blank 32. The master key 31 is adapted to cooperate with a stylus 33 secured on the cutter head 13 to raise and lower the head 13 in accordance with the notches on the master key 31 so that the milling cutter 16 will cut corresponding notches on the key blank 32.

Figure 2:
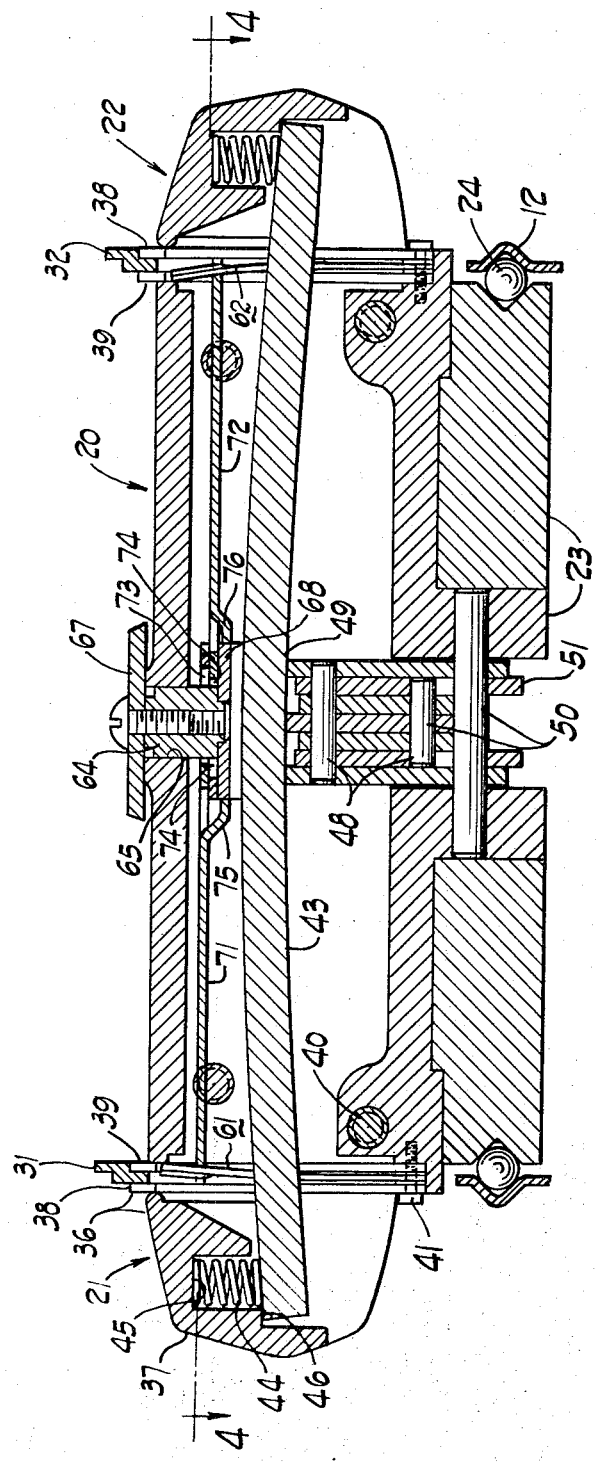
FIG. 2 is an enlarged sectional view on line 2—2 of FIG. 1.

FIG. 2 generally shows the internal construction of the vise structure 20 and since the first and second vises 21 and 22 are mirror images of each other, generally only the first vise 21 will be described. The first vise 21 includes movable vise jaw means 36 and a secondary jaw 39. The movable vise jaw means 36 includes a clamping block 37 and a separate jaw 38. The movable vise jaw means 36 is movably mounted on the frame 23 and in this preferred embodiment the block 37 is pivoted to frame 23 at the pivot 40. The secondary jaw 39 may be unitary with the vise frame 23 but in this preferred embodiment is a separate piece of hardened steel. Also the separate jaw 38 is a piece of hardened steel and these two jaws 38 and 39 are mounted by means of screws 41 to the vise frame 23 and this provides for limited movement between the two jaws.

A beam spring 43 lies inside the vise structure 20 and extends from the first vise to the second vise. The ends of the beam spring 43 cooperate with the clamping blocks in two ways. A coil compression spring 44 is disposed in a pocket 45 in the clamping block 37 and acts on the end of the beam spring 43. Also the clamping block 37 has a flat bearing surface 46 engaged by the end of the beam spring 43 upon slight compression of the compression spring 44. Mechanical advantage means 48 is mounted in the vise frame 23 and acts between the frame 23 and the central portion 49 of the beam spring 43. This mechanical advantage means includes a toggle mechanism 50 and a manual handle 51. The manual handle 51 may be considered a means to apply a force on the central portion of the beam spring 43 through the toggle mechanism 50. The handle 51 has clamped and released positions with the clamped position shown in FIGS. 1 and 2. The clamped position of the handle 51 acts through the mechanical advantage means to stress the beam spring 43 upwardly to close the vise jaws. When the handle 51 is moved upwardly about 45° from the clamped position shown in FIG. 1, then the handle is in the released position and the beam spring 43 is substantially unstressed.

The handle 51 would be in the released position before use of the machine. In such case the beam spring 43 is unstressed and the compression springs 44 supply a light force on the jaws to lightly grip the master key or the key blank as the key is inserted longitudinally by aid of the flaring lips 54 on the jaws.

The key vise structure 21 includes a bottom gauge 61 and 62, one for each of the vises 21 and 22, respectively. The bottom gauges are generally identical except for being the mirror image of each other and hence only one will be described. A cam shaft 64 is journalled for rotation in an aperture 65 in the vise frame 23. A handle 67 is secured to this cam shaft 64 to turn it. A cam 68 is fixed on the cam shaft 64 to turn therewith. Cam follower links 71 and 72 are provided to coact with the cam 68 and with the bottom gauges 61 and 62, respectively. The inner ends of the cam follower links 71 and 72 have an elongated aperture 73 and 74, respectively, surrounding the cam shaft 64. Such elongated apertures are of a width closely received on the cam shaft 64 to substantially eliminate lateral movement of the links 71 and 72 yet to permit longitudinal movement of such links. Cam followers 75 and 76 are lanced from the material of the links 71 and 72, respectively, to lie in the plane of and cooperate with the cam 68.

The upper end of the bottom gauges 61 and 62 contains a narrow slot 78 and the outer end of the links 71 and 72 has a narrow neck 79 which is receivable in the slot 78 to lie at the bottom of this slot and hence be interlinked with the gauge 61 or 62. Each vise jaw 38 and 39 has an aperture 80 which is adapted to accommodate the bottom gauge 61 or 62. FIG. 12 shows the bottom gauge 61 and shows that it has a forked lower end 81 of relatively slim legs to be resilient and the lower end is held by the screws 41. The bottom gauges 61 and 62 in the preferred embodiment are made from hardened steel which is tempered to have a spring characteristic and the bottom gauges are slightly bent before installation so that gauges 61 and 62 are naturally inclined toward the cam 68. By acting through the respective links 71 or 72, this natural resiliency urges the cam followers 75 and 76 into engagement with the cam 68. The top surface 83 and 84 of gauges 61 and 62 may be a gauging surface as shown in FIGS. 9, 10 and 11. Also the top surfaces 85 and 86 of the jaws 38 and 39 may be gauging surfaces as shown in FIGS. 7 and 8, respectively.

OPERATION

Figure 3:
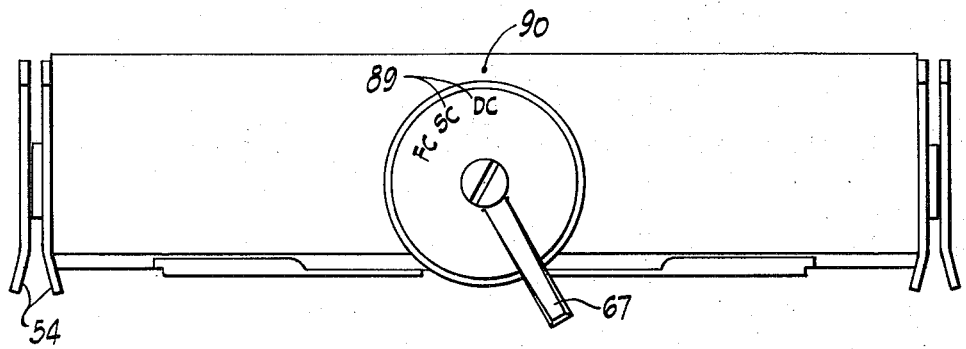
FIG. 3 is an enlarged partial top view of the key vise structure.
Figure 4:
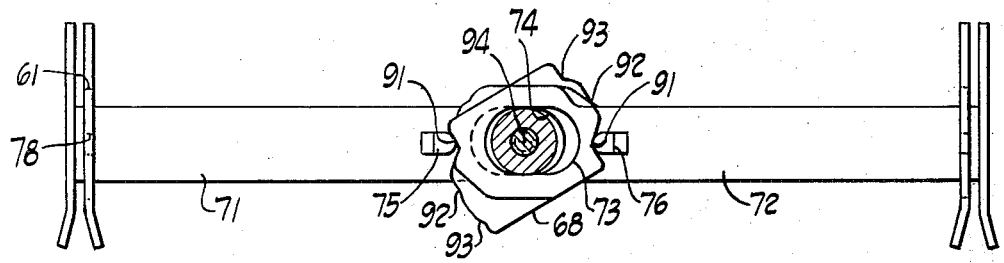
FIG. 4 is a partial view on line 4—4 of FIG. 2.

Before use of the machine, the handle 51 will be raised to the released position at about a 45° angle from that shown in FIG. 1. In this position a master key 31 may be inserted longitudinally in the first vise 21 up to a shoulder gauge 88 shown in FIG. 1. The key blank 32 is also inserted in the same way in the second vise 22. Each key is pressed down into the respective vise until it engages the bottom gauge 61 or 62. As shown in FIG. 3 the handle 67 has indicia 89 to cooperate with an index mark 90. In the preferred embodiment this indicia 89 may be FC, SC and DC or foreign cut, single cut and double cut, respectively. In FIG. 3 the handle 67 is shown in the double cut position and this also corresponds to the position shown in FIGS. 4, 7 and 8. In this position the cam 68 is so positioned that a first pair of diametrically opposed cam detent notches 91 is cooperating with the cam followers 75 and 76. The cam 68 also has second and third pairs of detent notches 92 and 93, respectively. The notches 91 are closest to the cam axis 94 of any of the notches and due to the spring tension of the gauges 61 and 62 the gauges are urged toward the cam by their self-bias to establish the gauges 61 and 62 within the aperture 80 in the stationary or secondary jaws 39. With the gauges 61 and 62 retracted within the secondary jaws 39, the keys 31 and 32 will be gauged by the gauging surfaces 85 and 86. One type of double cut key 32A, as shown in FIG. 7, has an offset to the right and hence a longitudinal rib 95 on this key will rest on the gauging surface 85 at the top of the movable jaw 38. The corresponding master key when put in the vise 21 will have the longitudinal rib 95 resting on the gauging surface 86.

The same manufacturer makes double cut keys which are offset to the left such as the key blank 32B shown in FIG. 8. This key has a longitudinal rib 96 which key blank 32B will rest on the gauging surface 86 of the secondary jaw 39 in vise 22. The corresponding master key offset to the left, when clamped in the vise 21, will have the longitudinal rib 96 resting on the gauging surface 85. This gauging surface 85 may be seen in FIG. 10.

Figure 5:
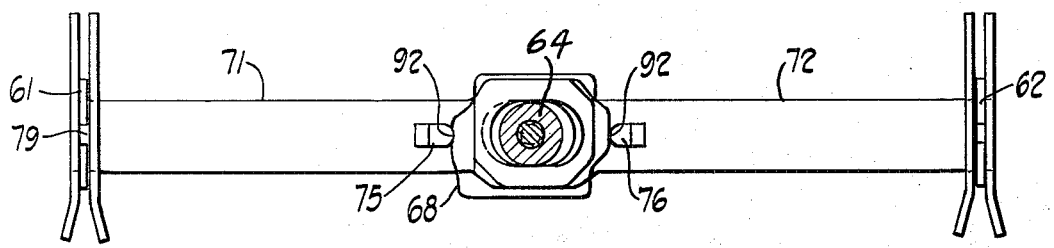
FIGS. 5 and 6 are views similar to FIG. 4 but with the gauges in a different position.

If one wishes to clamp a single cut key then the handle 67 is moved to the center position where the cam 68 is in the position shown in FIG. 5. In this case the second pair of detent notches 92 will cooperate with the cam followers 75 and 76. These notches are not as close to the cam axis 94 as the first pair of notches 91 and hence this pushes the cam follower links 71 and 72 outwardly so that the gauges 61 and 62 are substantially centered between the jaws 38 and 39. This is the position shown not only in FIG. 5 but in FIG. 9. In such case the bottom edge of the single cut key 32C will rest on the top or gauging surface 84 of the gauge 62. In a similar manner the master key corresponding to the key blank 32C will also rest on the gauging surface 83 at the top of the gauge 61 in vise 21.

Figure 6:
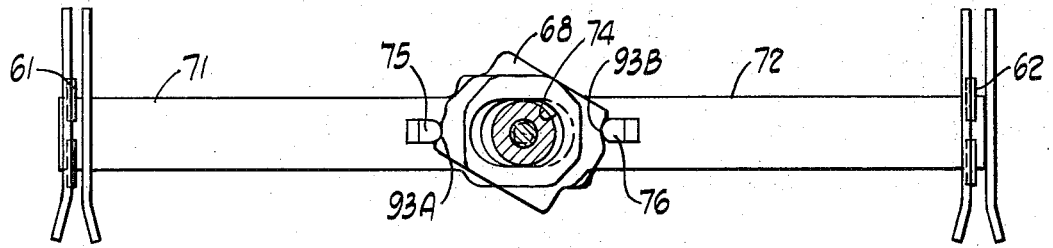

FIGS. 10 and 11 illustrate a third type of key 31D for the master key and 32D for the key blank. Such keys have bits or notches on both edges and have a longitudinal rib 97 which is a gauging rib adapted to engage the gauging surface 83 or 84. Since both edges of the key must be cut, the key normally is first clamped in the vise in the same manner as shown in FIG. 7. Just the thin outer edge is clamped in the vise with the longitudinal rib 97 of the key blank 32D resting on the gauging surface 85 of the movable jaw 38. In a similar manner the master key corresponding thereto would be clamped in the vise 21 with the longitudinal rib 97 abutting the gauging surface 86 of the secondary jaw 39. Next, in order to cut the notches in the opposite edge of the key, it will be turned over and the handle 67 will be turned to the foreign cut position. This will be the position shown in FIGS. 6, 10 and 11. In such position, the cam 68 has the third pair of notches 93 coacting with the cam followers 75 and 76. This third pair of notches 93 includes a notch 93A and a notch 93B. Notch 93A coacts with cam follower 75 and notch 93B coacts with cam follower 76. Notch 93A is farther from the cam axis 94 than the notch 93B. This establishes a half-way position of the bottom gauges 61 and 62 with gauge 61 half-way into the aperture 80 in the movable jaw 38 and gauge 62 half-way disposed in the aperture 80 in the secondary jaw 39. This assymmetrical condition is as shown in FIGS. 10 and 11. The bottom gauge 61 is moved quite a bit farther away from the cam axis than the gauge 62 is moved. The reason will become apparent from a review of FIGS. 10 and 11 wherein the master key 31D is positioned in the same attitude as the key blank 32D. The bottom gauge 61 is in abutment with the longitudinal rib 97 and also the bottom gauge 62 is in engagement with this longitudinal rib 97. Accordingly, the assymmetrical position of the gauges 61 and 62 permits the keys 31D and 32D to be positioned in the same attitude in the vises 21 and 22.

The above description shows that the bottom gauges 61 and 62 are simply positioned merely by moving the handle 67 which handle positions simultaneously the bottom gauges for both the vises. Also, considerable flexibility is provided without any adapters which may become lost because the vise structure may be used to clamp and to gauge many different types of keys.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A key vise structure, comprising in combination,
a frame,
a vise having a movable and a secondary vise jaw,
a bottom gauge for said vise mounted for limited lateral movement between first and second positions in said vise,
an aperture in one of said vise jaws to accommodate said lateral movement of said bottom gauge,
a cam pivotally mounted on said frame and movable into first, second and third conditions,
and a cam follower link coacting with said cam and with said gauge to laterally move said gauge in accordance with movement of said cam among said first, second and third conditions to move said gauge at least partially into said jaw aperture in one position of said gauge.

2. A key vise structure as set forth in claim 1, including an aperture in the other of said vise jaws to accommodate lateral movement of said bottom gauge,
and said third condition of said cam moving said gauge into said jaw aperture in the other of said jaws.

3. A key vise structure comprising in combination,
a frame,
a first and a second vise on said frame each having a movable and a secondary vise jaw,
a first and a second bottom gauge for said first and second vises, respectively, mounted for limited lateral movement between first and second positions in said vise,
an aperture in one of said vise jaws to accommodate lateral movement of one of said bottom gauges,
a cam pivotally mounted on said frame and movable into first and second conditions,
first and second cam follower links coacting with said cam and with said gauges to laterally move said gauges in accordance with movement of said cam between said first and second conditions to move said gauges at least partially into said jaw apertures in one position of said gauges,
and said cam having a shape in one condition to move said second gauge an amount different from movement of said first gauge.

4. A key vise structure as set forth in claim 3, including an aperture in one of said jaws of said second vise to accommodate lateral movement of said bottom gauge,
and said cam laterally moving said second gauge partially into and partially out of said jaw aperture in said second vise in one condition of said cam.

5. A key vise structure as set forth in claim 3, wherein said cam has a third condition,
and movement of said cam into said third condition laterally moving both cam follower links and both gauges to move said gauges at least partially into apertures in said jaws.

6. A key vise structure as set forth in claim 5, wherein said first and second positions of said two gauges are symmetrical relative to the cam axis and said third position of said gauges is assymmetrical.

7. A key vise structure as set forth in claim 5, including three pairs of diametrically opposite cam notches in said cam establishing said first, second and third conditions with each said first and second pair being symmetrical relative to the cam rotational axis and said third pair being assymmetrical to move the gauges differently in said first and second vise for said third cam condition.

8. A key vise structure comprising in combination,
a frame,
a vise having a movable and a secondary vise jaw,
a bottom gauge for said vise mounted for limited lateral movement between first and second positions in said vise,
an aperture in one of said vise jaws to accommodate said lateral movement of said bottom gauge,
a cam pivotally mounted on said frame and movable into first and second conditions,
a cam follower link coacting with said cam and with said gauge to laterally move said gauge in accordance with movement of said cam between said first and second conditions to move said gauge at least partially into said jaw aperture in one position of said gauge,
a cam shaft pivotally mounted on said frame and fixedly carrying said cam,
and said link having an elongated aperture encompassing said cam shaft and closely received in the width dimension of the aperture to limit lateral movement of said link and being elongated in the longitudinal direction of said link to permit longitudinal movement of said link.

9. A key vise structure as set forth in claim 8, including said cam follower being lanced from the material of said link adjacent said elongated aperture to be displaced from the plane of said link and into the plane of said cam.

10. A key vise structure as set forth in claim 3, including a third position of said cam,
said cam having a shape to establish mirror image movement of said links relative to the cam axis for said first and second conditions of said cam and establishing non-identical movements of said links as said cam is moved from said second to said third condition.

11. A key vise structure as set forth in claim 3, including a third position of said cam,
said cam having a shape to establish mirror image movement of said links relative to the cam axis for said first and second conditions of said cam and establishing non-identical movements of said links as said cam is moved from said second to said third condition to establish each said gauge in a half-way position engaging an edge of a longitudinal projection remote from the edge of the key and with the two keys in the two vises positioned in the same attitude.

* * * * *